United States Patent [19]
Lin

[11] Patent Number: 5,748,265
[45] Date of Patent: May 5, 1998

[54] PICTURE TUBE FIXING DEVICE

[76] Inventor: Deng-Nan Lin, No. 35, Li Lin E. Rd., Ch'iao Tou Hsiang, Kao Hsiung Hsien, Taiwan

[21] Appl. No.: 601,148

[22] Filed: Feb. 13, 1996

[51] Int. Cl.⁶ .................. H04N 5/645; H04N 5/64
[52] U.S. Cl. .................. 348/825; 348/826; 248/309.1
[58] Field of Search .................. 348/825, 826, 348/827, 836, 844; 248/309.1; H04N 5/645, 5/64

[56] References Cited

FOREIGN PATENT DOCUMENTS

| | | | |
|---|---|---|---|
| 0302026 | 2/1989 | European Pat. Off. | H04N 5/645 |
| 0403012 | 12/1990 | European Pat. Off. | H04N 5/645 |
| 3516122 | 11/1986 | Germany | H04N 5/64 |
| 3709330 | 3/1988 | Germany | H04N 5/645 |
| 3736637 | 5/1989 | Germany | H04N 5/645 |
| 3736802 | 5/1989 | Germany | H04N 5/645 |
| 0269273 | 6/1989 | Germany | H04N 5/645 |
| 0280649 | 7/1990 | Germany | H04N 5/645 |
| 0194782 | 8/1990 | Japan | H04N 5/645 |
| 404077071 | 3/1992 | Japan | H04N 5/645 |
| 404077187 | 3/1992 | Japan | H04N 5/645 |
| 405191748 | 7/1993 | Japan | H04N 5/645 |
| 406062350 | 3/1994 | Japan | H04N 5/645 |
| 406181554 | 6/1994 | Japan | H04N 5/645 |

Primary Examiner—Thomas L. Stoll
Attorney, Agent, or Firm—Bacon & Thomas

[57] ABSTRACT

The present invention relates to a device for fixing a picture tube having a lug on a shell of a screen, includes a threaded device, a prop device mounted on the shell of the screen for receiving the threaded device and fixing the lug of the picture tube thereon with said threaded device, and an adjusting device adjustably extending from a top of and confined by the prop device for compensating a space between the lug and the prop device thus fixing the picture tube through the lug. The present invention provides a cheap and easy-assembling fixing device for compensating space between picture tube and prop of the screen shell and well fixing the picture tube in the screen shell.

6 Claims, 11 Drawing Sheets

PICTURE TUBE FIXING DEVICE

FIELD OF THE INVENTION

The present invention relates to a fixing device, especially to a picture tube fixing device for compensating a space between a lug of a picture tube and a screen shell, thus properly fixing the picture tube in the screen shell.

BACKGROUND OF THE INVENTION

A cathode ray tube (CRT), or so called a picture tube, is a very important display device in television or computer monitor. A picture tube is often made of glass and is often fixed in a screen shell to protect it from being broken.

Figure 1A:
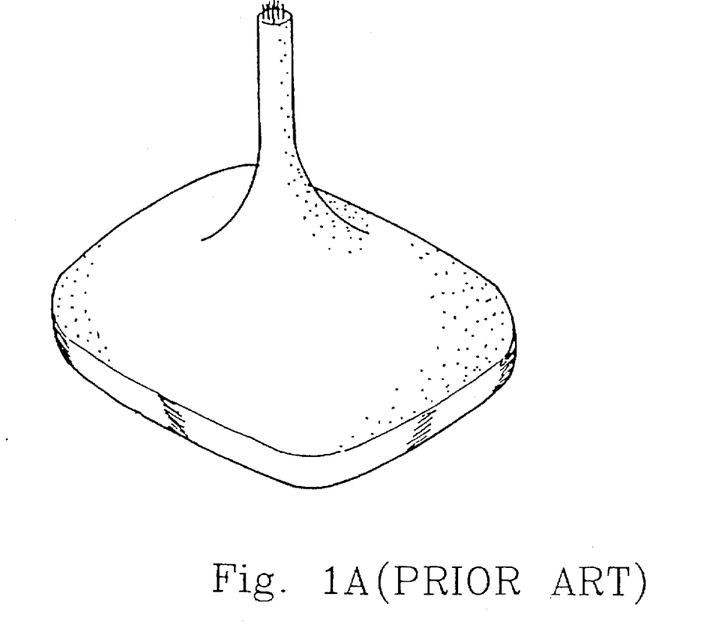
FIG. 1A is a perspective view of a conventional non-lugged picture tube.
Figure 1B:
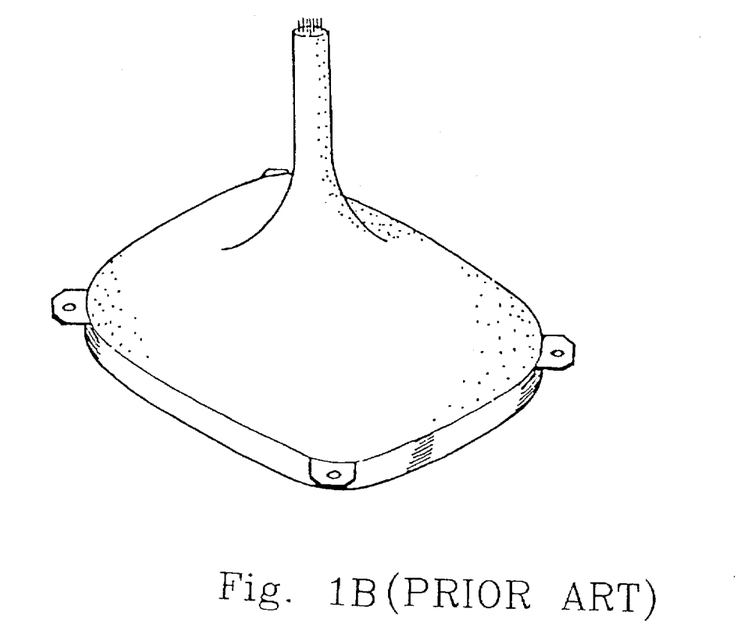
FIG. 1B is a perspective view of a conventional lugged picture tube.
Figure 1C:
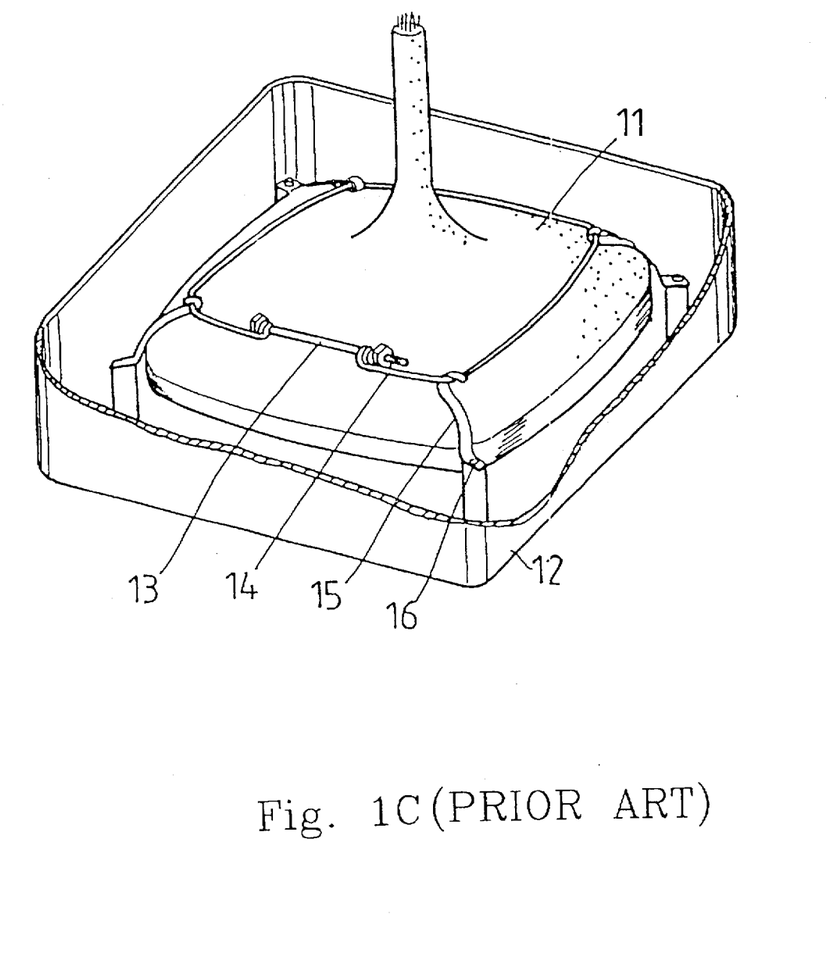
FIG. 1C is a perspective view of a conventional non-lugged picture tube assembled in a screen shell.

There are two types of picture tubes with different fixing structures. One of which, as shown in FIG. 1A, does not have lug. The other has four lugs around the picture tube, as illustrated in FIG. 1B. Referring to FIG. 1C, a picture tube 11 without lug is fixed on screen shell 12 by means of a metal ring 14 whose radius is variable by an adjustable bolt 13, and four hooks 15 made of metal sheets. One end of each hook 15 is used to hook up the metal ring 14, while the other end is fixed on one of the four corners of the screen shell 12 by screw 16. While the hooks 15 are fixed on the four corners respectively, the adjustable bolt 13 is screwed to reduce the metal ring 14. Thus, the picture tube 11 is fixed on the screen shell 12 tightly.

The picture tube without lug is cheaper than that with lugs, but there are several defects in fixing this type of picture tube:

1. The fixing mechanism needs a lot of elements.
2. The assembling procedure is complex.
3. A suitable tension of the metal ring 14 is hardly obtainable. A tight metal ring 14 may deform the screen shell 12, while a loose one cannot fix the picture tube properly.

Figure 2A:
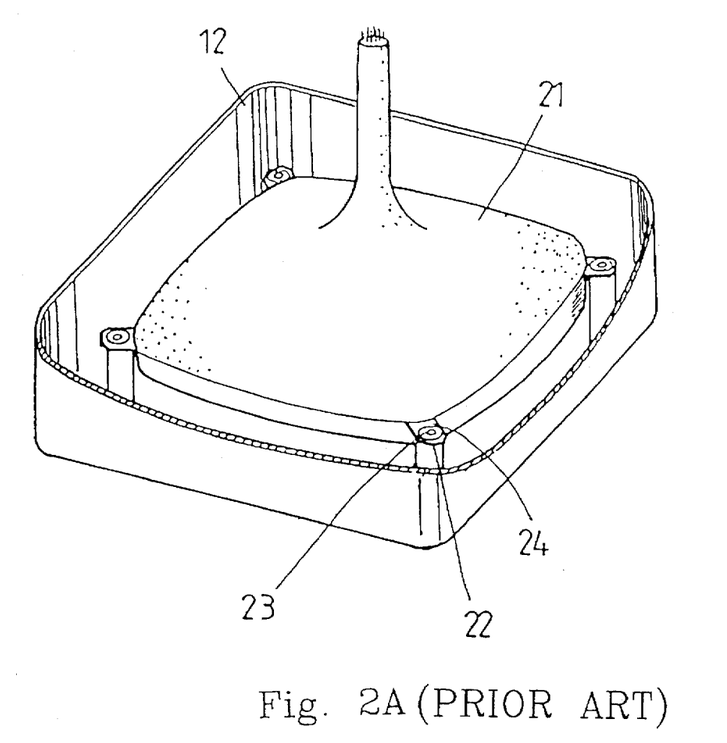
FIG. 2A is a perspective view of a conventional lugged picture tube assembled in a screen shell.
Figure 2B:
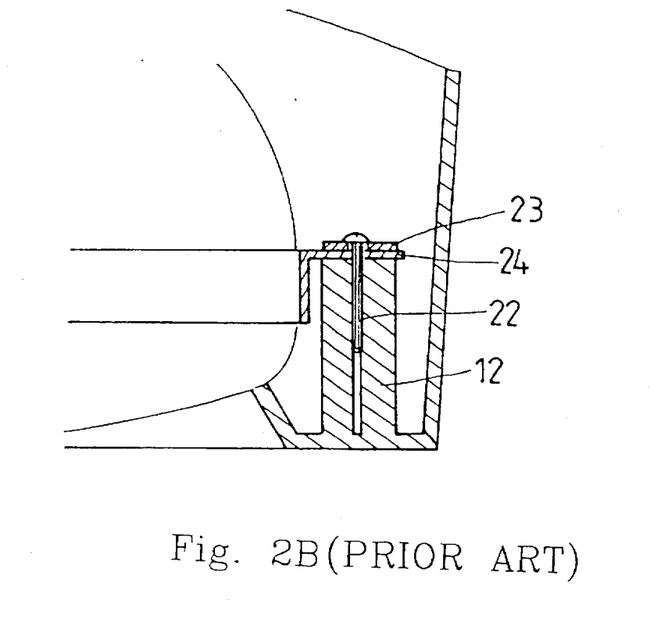
FIG. 2B is a partial cross-section view of a picture tube according to FIG. 2A.

There are several structures for fixing a lugged picture tube, one of which is illustrated in FIGS. 2A, and 2B. Four lugs 24 are fixed on the screen shell 12 by four screws 22 and four washers 23 respectively. The structure is simple and easy to be assembled.

Figure 3A:
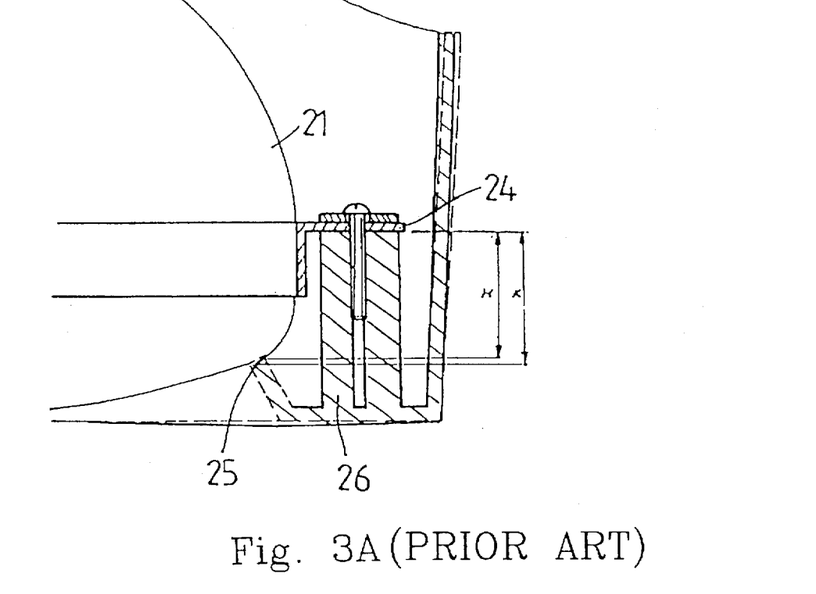
FIG. 3A is an illustration of a tight assemblage according to FIG. 2A.
Figure 3B:
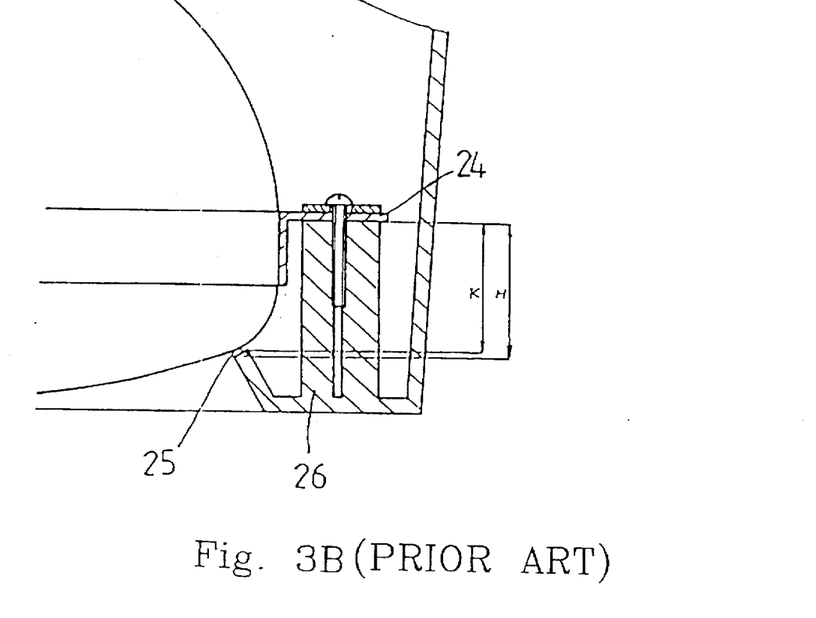
FIG. 3B is an illustration of a loose assemblage according to FIG. 2A.

However, a very serious problem exists. Referring to FIGS. 3A and 3B, due to the error in making picture tubes, the distance K between a lug and the contact point 25 of the edge of the screen shell 12 has an error range of ±2 mm, but the prop length H is fixed and not adjustable because the prop is integrally formed on the screen shell 12. If the distance K is longer than the prop length H, the screen shell 12 will be deformed by the picture tube 21 when the lug 24 is screwed to contact with the top of the prop 26. When the prop length H is longer than the distance K, a space will exist between the screen shell 12 and the picture tube 21 which will reduce the stability of the television or computer monitor. In order to overcome this problem, a classification of the picture tubes coupled with suitable compensating washers is needed, which makes the manufacturing procedure troublesome and time-consuming. On the other hand, a requirement of small tolerance picture tubes will raise the cost and is not economical.

Figure 4A:
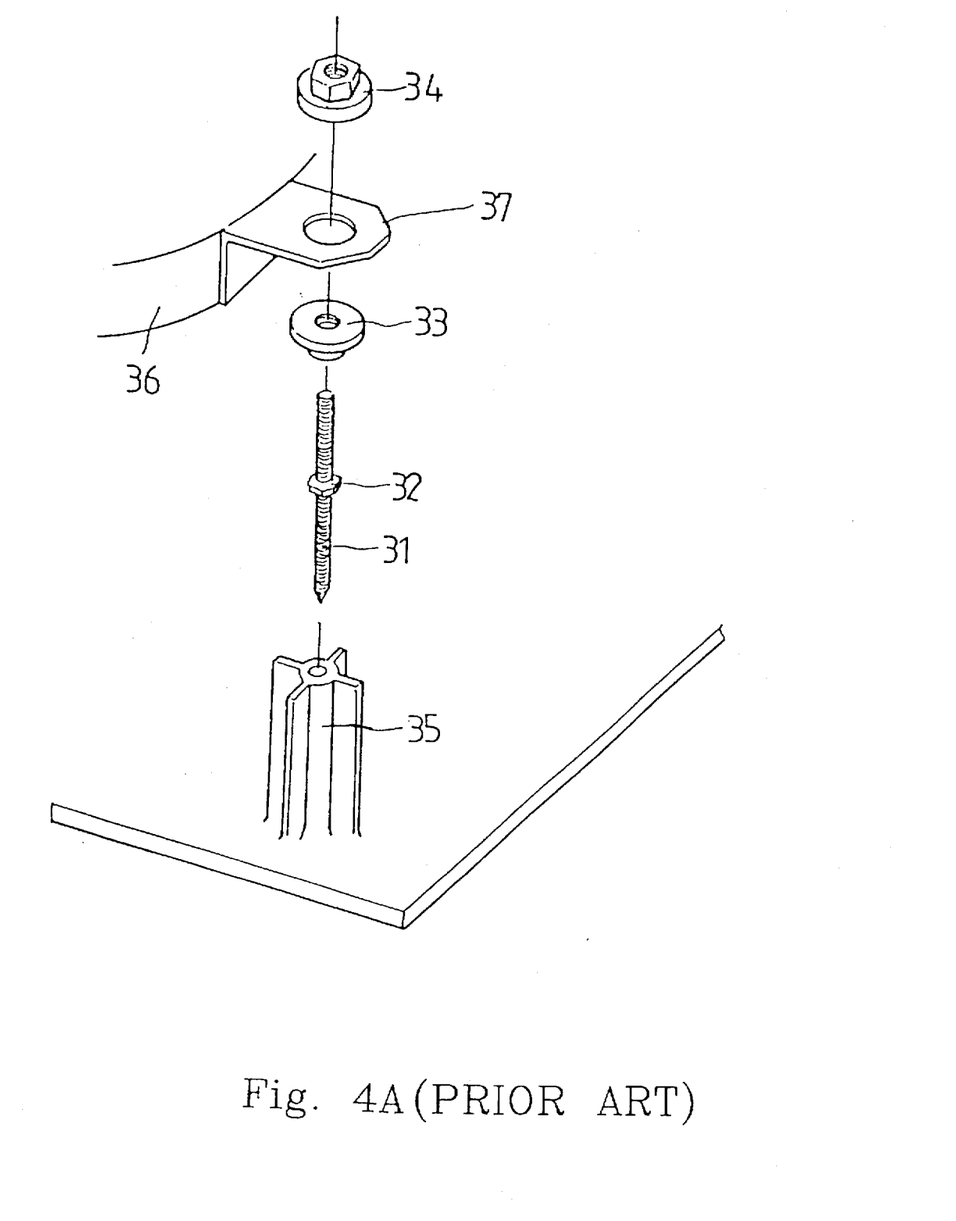
FIG. 4A is an explosive drawing of a conventional fixing device for a lugged picture tube.
Figure 4B:
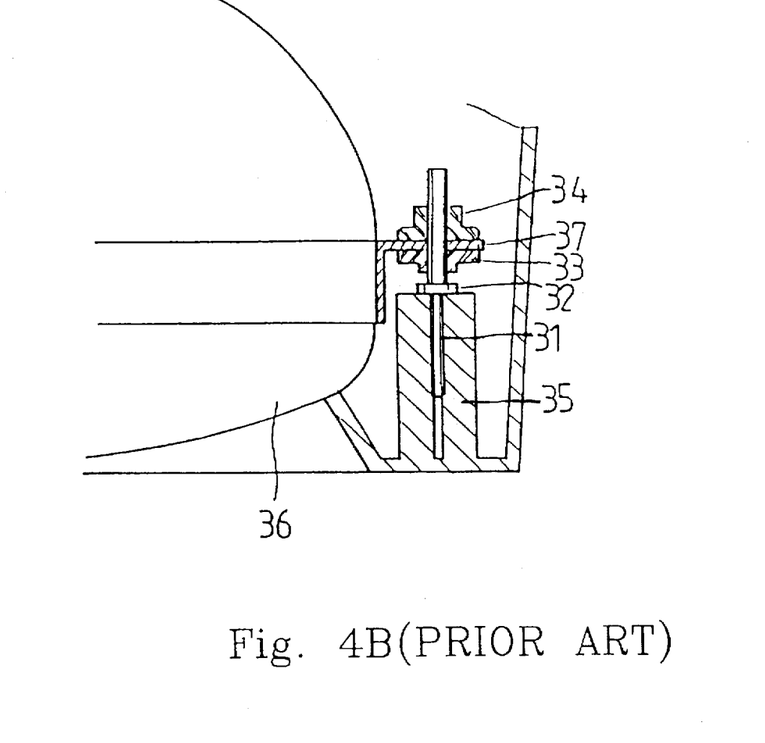
FIG. 4B is a cross-section view of a conventional fixing device according to FIG. 4A.

Another conventional device is illustrated in FIGS. 4A and 4B, which includes a bolt 31 with a fixed nut 32, a threaded and adjustable washer 33 and a movable nut 34. The washer 33 is screwed until it contacts against the bottom of lug 37, then the movable nut 34 is screwed on bolt 31 to fix the picture tube 21.

The conventional device provides an adjustable means to fix the picture tube, but the assembling procedure is complex and the elements are still relatively expensive.

Figure 4C:
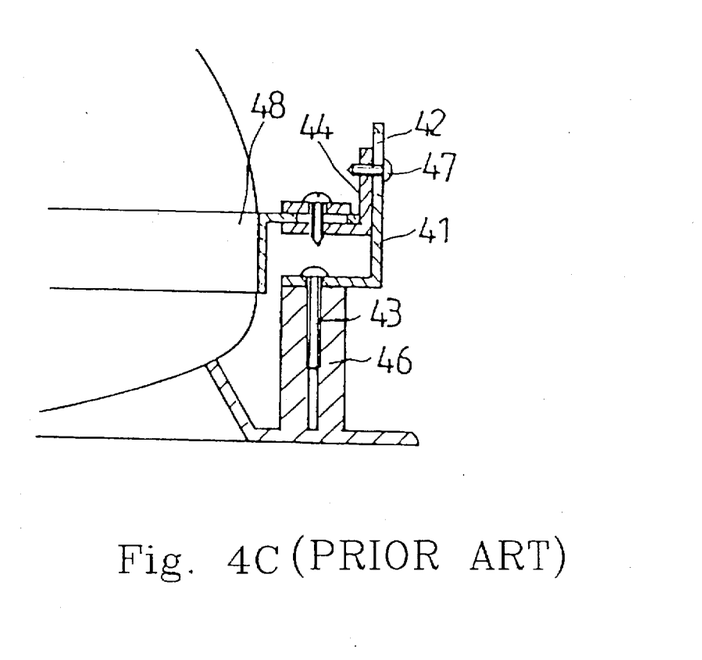
FIG. 4C is a cross-section view of another conventional fixing device for a lugged picture tube.

The third type of conventional picture fixing device is shown in FIG. 4C, wherein an L-shaped supporter 41 is fixed on the screen shell 46 by a screw 43, and a second L-shaped supporter 44 which is movable on a slot 42 of supporter 41 is adjusted to a suitable position and fixed on supporter 41 by a screw 47. The lug of picture tube 48 is then fixed on the supporter 44. The complex elements and manufacturing procedure bring on high cost and low efficiency.

It is therefore attempted by the applicant to deal with all the problems described above.

SUMMARY OF THE INVENTION

The object of the present invention is to provide a fixing device for a picture tube which has cheap and simple elements and is easily assemblable and, the most important, can compensate a space between the lug and the screen shell to make the picture tube be suitably fixed in the screen shell.

The present invention relates to a device for fixing a picture tube having a lug on a shell of a screen, which includes a threaded means, a prop means mounted on the shell of the screen for receiving the threaded means and fixing the lug of the picture tube thereon with the threaded means, and an adjusting means adjustably extending from a top of and confined by the prop means for compensating a space between the lug and the prop means thus fixing the picture tube through the lug.

The fixing device further includes a washer means and has a through hole aligning with a through hole of the lug of the picture tube.

The threaded means preferably includes an upper shank which has a radius larger than that of the through hole of the washer means, and a lower shank having a radius smaller than that of the upper shank.

The adjusting means preferably includes a crown having a through hole and a female thread enabling the adjusting means to be raised to contact against the lug of the picture tube while the threaded means is screwed on, and a leg or a plurality of lags for bridging the adjusting means and the prop means.

The prop means preferably includes a center prop for receiving therein the threaded means, and a side prop or a plurality of side props for confining therein the leg(s) of the adjusting means.

In another aspect of the present invention, the washer means preferably has a plurality of radial slots distributed around the through hole of the washer means.

In another aspect of the present invention, the washer means preferably has a plurality of protuberances protruding in the through hole of the washer means for stopping the upper shank while the adjusting means is being raised by the lower shank.

In another aspect of the present invention, the adjusting means preferably includes a crown which has a through hole and a female thread, and a flexible leg for bridging the adjusting means and the prop means and upwardly urging the crown. Accordingly, the prop means preferably includes a center prop for receiving the threaded means, and a side prop for confining the leg of the adjusting means.

The present invention may best be understood through the following description with reference to the accompanying drawings, in which:

DETAILED DESCRIPTION OF THE PREFERRED EMBODIMENT

Figure 5:
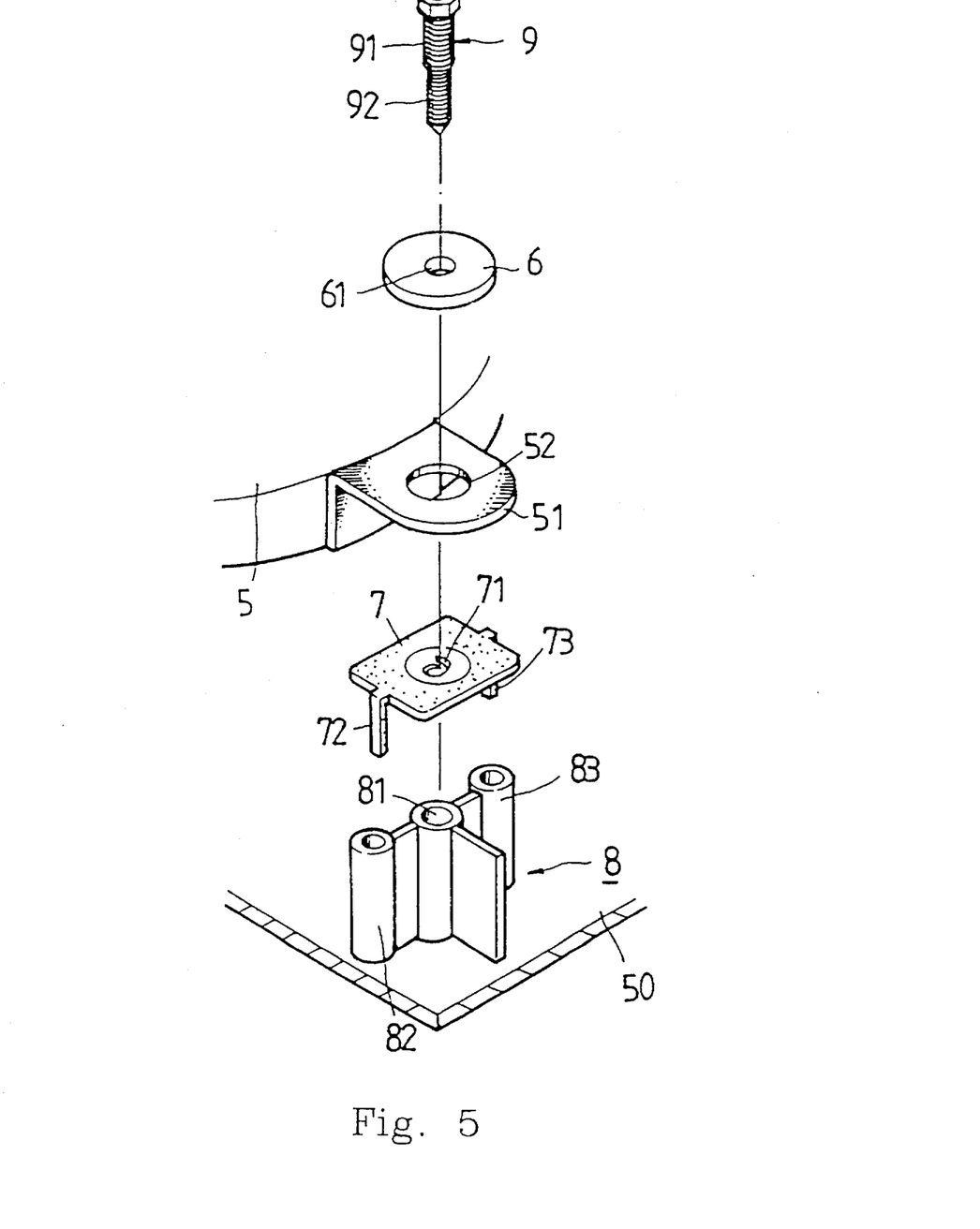
FIG. 5 is an explosive drawing of a fixing device according to the present invention.
Figure 6:
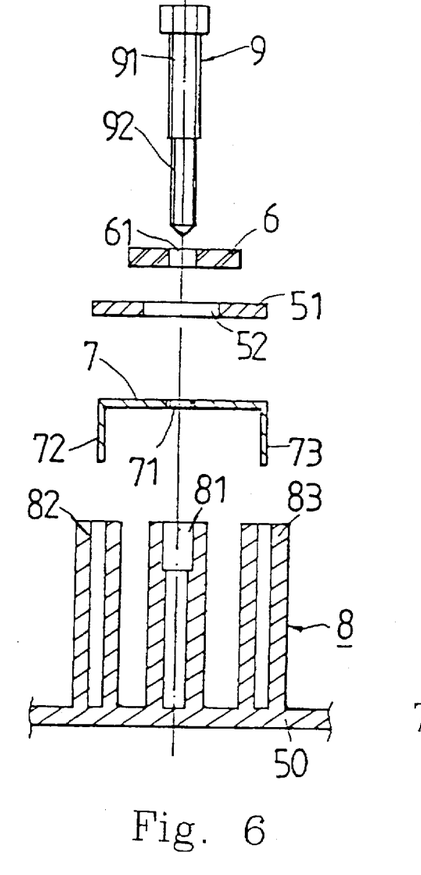
FIG. 6 is an explosive cross-section view of a fixing device according to the present invention.

Referring to FIG. 5, a preferred embodiment of the present invention includes a washer means 6, an adjusting means 7, a prop 8 and a screw 9 having two different radii. The prop 8 is formed in a corner of screen shell 50 and has a through hole 81. Next to prop 8, there are two tubular side props 82 and 83. The adjusting means 11 is reversed U-shaped and locates between a lug 51 and prop 8. The crown of adjusting means 7 has a threaded hole 71 on its center, aligning with a through hole 81 of prop 8. Legs 72 and 73 are inserted into the tubular side props 82 and 83, respectively, to limit the movement of adjusting means 7 in the vertical direction.

Figure 7:
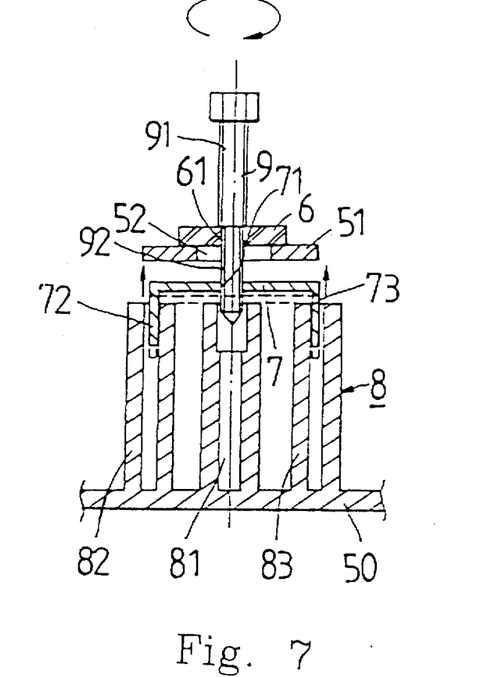
FIG. 7 is a cross-section view of a fixing device being assembled according to the present invention.
Figure 8:
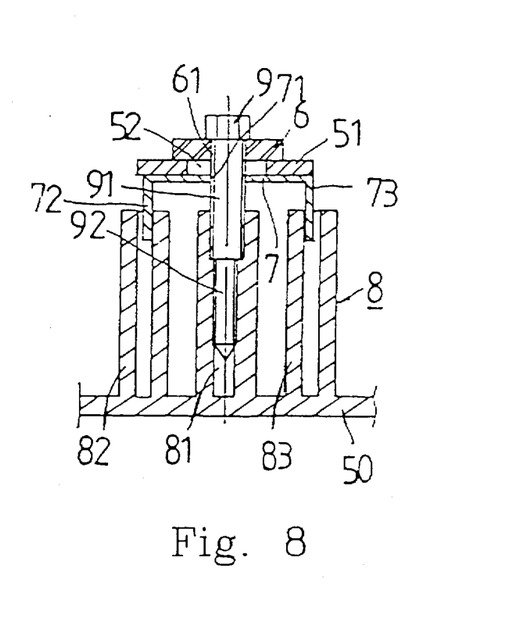
FIG. 8 is a cross-section view of an assembled fixing device according to the present invention.

Washer 6, which is located above lug 51, is made of a material which is easy to be cut. The thickness of washer 6 is greater than a pitch of screw 9. Through hole 61 is located on the center of washer 6, and aligns with through holes 52, 71 and 81 of lug 51, adjusting means 7 and prop 8 for being penetrated by screw 9. The shank of screw 9 is divided into two sections. The upper shank 91 has a radius slightly larger than that of through hole 61, while the lower shank 92 has a radius smaller than that of upper shank 91. While screwing, through hole 71 will finally be widened by upper shank 91 after it threadedly meshes with lower shank 92, and screw 9 is penetrating through washer 6, lug 51, adjusting means 7 and prop 8 to fix the picture tube 5 on the screen shell 50. Referring to FIG. 7, in the beginning of screwing, the upper shank 91 will remain positioned above the washer 6 due to its larger radius, and the adjusting means 7 will be raised up by the screwing of lower shank 92 and the confining of side props 82 and 83. The adjusting means 7 moves towards lug 51 and clips it with washer 6. The extensions 72 and 73 of the adjusting means 7 from prop 8 to lug 51 compensate the space between picture tube 5 and prop 8, thus providing a well support to lug 51 without deforming screen shell 50. All the assembling procedure is finished simply by the screwing of screw 9. Thus, the present invention provides a cheap and easy-assembling fixing device for compensating the space between picture tube 5 and prop 8 of the screen shell 50 and well fixes the picture tube in the screen shell.

When the crown of adjusting means 7 is touching against lug 51 and the clipping force of adjusting means 7 and washer 6 to lug 51 is getting larger, the friction between washer 6 and lug 51 is also getting larger. Thus, upper shank 91 will overcome the stop force of washer 6 and screw down when washer 6 is no longer slidable. Screw 9 will keep on screwing into prop 8 until the top cap of screw 9 touches washer 6 and fixes picture tube 5 properly in screen shell 50.

Figure 9:
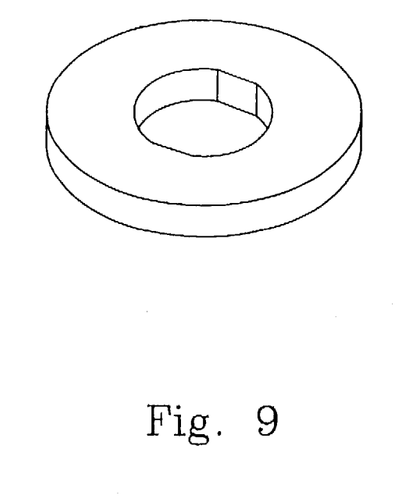
FIG. 9 is a preferred embodiment of a washer according to the present invention.

In order to stop upper shank 91 when lower shank 92 is caused to raise adjusting means 7 and then allow upper shank 91 to penetrate through when adjusting means 7 has touched against lug 51, a preferred embodiment of washer 6, as shown in FIG. 9, is provided. Through hole 61 has a radius about the same with that of the upper shank 91. A plurality of flat portion are provided around the wall of through hole 61 to increase friction between upper shank 91 and washer 6.

Figure 10:
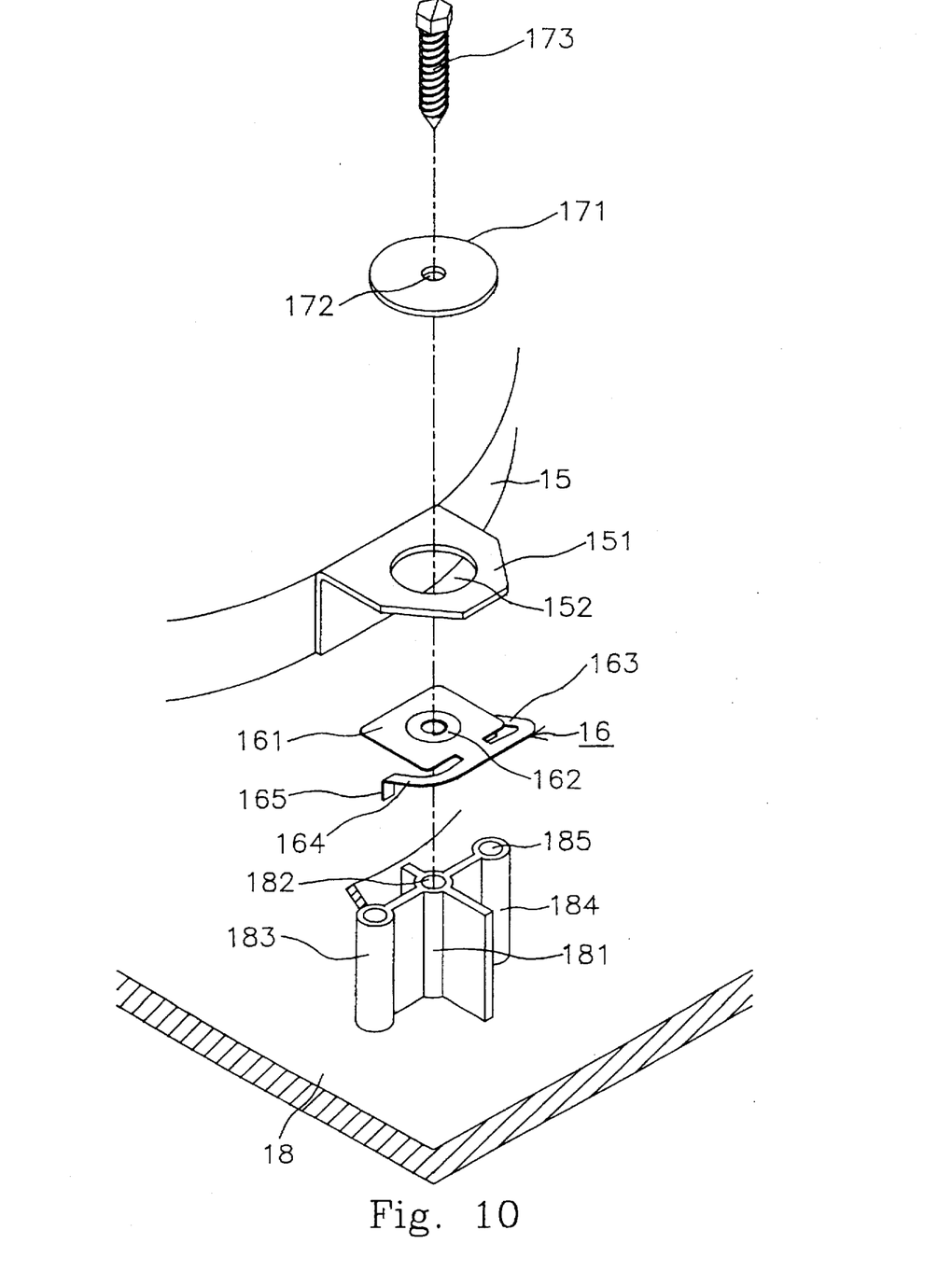
FIG. 10 is an explosive drawing of another preferred embodiment of a fixing device according to the present invention.
Figure 11:
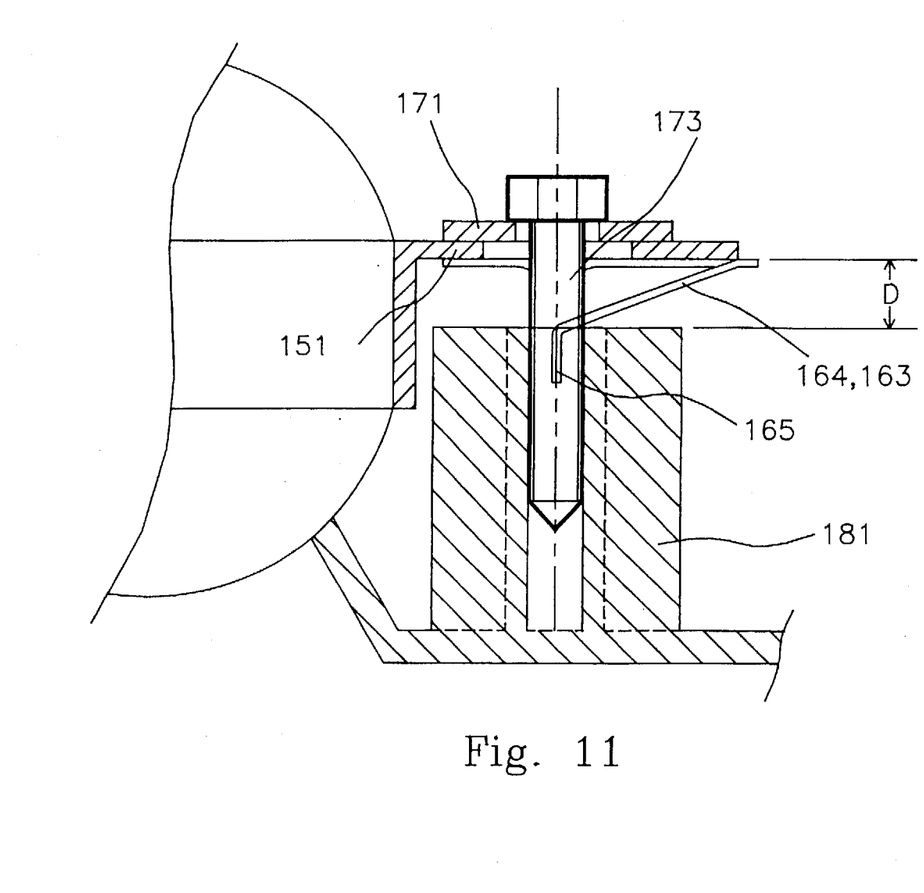
FIG. 11 is a partial cross-section view of a assembled fixing device according to FIG. 10.

A simplified preferred embodiment of the fixing device is also shown. Referring to FIG. 10, a threaded means 173 with a uniform shank replace the two sectioned screw 9, and legs 163,164 of adjusting means 16 is made of an elastic material. Referring to FIG. 11, while being assembled, the adjusting means 16 is compressed in vertical direction having a height larger than the distance D between the lug 151 and the prop 181, and thus the spring force will help the adjusting means 16 rise toward the lug 151 while the threaded means is screwed on.

While the invention has been described in terms of what are presently considered to be the most practical and preferred embodiments, it is to be understood that the invention need not be limited to the disclosed embodiment. On the country, it is intended to cover various modifications and similar arrangements included within the spirit and scope of the appended claims which are to be accorded with the broadest interpretation so as to encompass all such modifications and similar structures.

What is claimed is:

1. A device for fixing a picture tube having a lug on a shell of a screen, said lug having a through hole, said device comprising:

a washer means having a through hole aligning with said through hole of said lug of said picture tube;

a threaded means having an upper shank having a radius larger than that of said through hole of said washer means, and a lower shank having a radius smaller than that of said upper shank, the upper and lower shanks being threaded in the same direction;

a prop means mounted on said shell of said screen for receiving said threaded means and fixing said lug of said picture tube thereon with said threaded means; and an adjusting means adjustably extending from a top of and confined against rotation by said prop means for compensating a space between said lug and said prop means thus fixing said picture tube through said lug, wherein said adjusting means has a through hole with a thread enabling said adjusting means to be raised to contact against said lug of said picture tube while said threaded means is screwed on.

2. A device according to claim 1 wherein said adjusting means comprises:

a crown having therein said through hole; and a leg for bridging said adjusting means and said prop means.

3. A device according to claim 2 wherein said prop means comprises:

a center prop for receiving therein said threaded means; and a side prop for confining therein said leg of said adjusting means.

4. A device according to claim 3 wherein said washer means has a plurality of radial slots distributed around said through hole of said washer means.

5. A device according to claim 3 wherein said washer means has a plurality of protuberances protruding in said through hole of said washer means for stopping said upper shank while said adjusting means is being raised by said lower shank.

6. A device according to claim 1 wherein said thread of said through hole of said adjusting means is a female thread.

* * * * *